US012560686B2

(12) United States Patent
Greiner et al.

(10) Patent No.: US 12,560,686 B2
(45) Date of Patent: Feb. 24, 2026

(54) METHOD FOR GENERATING LIGHT PULSES OF A LIDAR SYSTEM

(71) Applicant: Robert Bosch GmbH, Stuttgart (DE)

(72) Inventors: Alexander Greiner, Reichenbach (DE); Holger Maris Gilbergs, Sersheim (DE); Johannes Richter, Ludwigsburg (DE); Reiner Schnitzer, Reutlingen (DE); Simon Bell, Sersheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1009 days.

(21) Appl. No.: 17/763,057

(22) PCT Filed: Oct. 12, 2020

(86) PCT No.: PCT/EP2020/078620
§ 371 (c)(1),
(2) Date: Mar. 23, 2022

(87) PCT Pub. No.: WO2021/074081
PCT Pub. Date: Apr. 22, 2021

(65) Prior Publication Data
US 2022/0334234 A1      Oct. 20, 2022

(30) Foreign Application Priority Data

Oct. 15, 2019      (DE) ..................... 10 2019 215 831.5

(51) Int. Cl.
*G01S 7/487*          (2006.01)
*G01S 7/48*          (2006.01)
(Continued)

(52) U.S. Cl.
CPC .......... *G01S 7/4873* (2013.01); *G01S 7/4808* (2013.01); *G01S 7/4861* (2013.01); *G01S 17/10* (2013.01)

(58) Field of Classification Search
CPC .... G01S 7/4873; G01S 7/4808; G01S 7/4861; G01S 17/10; G01S 7/484; G01S 17/18; G01S 17/42; G01S 17/931
(Continued)

(56) References Cited

U.S. PATENT DOCUMENTS

2009/0080467 A1      3/2009   Starodoumov et al.
2017/0146641 A1      5/2017   Walsh et al.
(Continued)

FOREIGN PATENT DOCUMENTS

CN          107005023 A      8/2017
CN          208156196 A      11/2018
(Continued)

OTHER PUBLICATIONS

International Search Report for PCT/EP2020/078620 Issued Jan. 12, 2021.

*Primary Examiner* — Md M Rahman
(74) *Attorney, Agent, or Firm* — NORTON ROSE FULBRIGHT US LLP

(57) ABSTRACT

A method for generating light pulses of a LIDAR system. The method includes the following steps: a) generating a light pulse sequence, including at least one first light pulse and one second light pulse of different intensities by a light source, in particular a laser; b) emitting the light pulse sequence by the LIDAR system; c) receiving, by the LIDAR system, a portion of the light pulse sequence reflected by an object; d) evaluating the received portion of the light pulse sequence for measuring distance. A corresponding LIDAR system, a computer program and a machine-readable memory medium are also described.

14 Claims, 5 Drawing Sheets

(51) Int. Cl.
    *G01S 7/4861*     (2020.01)
    *G01S 17/10*     (2020.01)

(58) Field of Classification Search
    USPC ........................................................ 356/4.01
    See application file for complete search history.

(56)           References Cited

U.S. PATENT DOCUMENTS

| 2017/0363740 | A1 | | 12/2017 | Kubota et al. |
| 2018/0188358 | A1 | | 7/2018 | Li et al. |
| 2021/0165100 | A1 | * | 6/2021 | Ramsteiner ........... G01S 17/931 |

FOREIGN PATENT DOCUMENTS

| CN | 109116331 | A | | 1/2019 | |
| DE | 102012217655 | A1 | | 3/2014 | |
| EP | 596614 | A2 | | 5/1994 | |
| EP | 1884797 | A1 | | 2/2008 | |
| EP | 2395368 | A1 | | 12/2011 | |
| EP | 2637038 | A1 | | 9/2013 | |
| EP | 3543734 | A1 | * | 9/2019 | .......... G01S 7/4868 |
| JP | 2856209 | B1 | * | 2/1999 | |
| JP | 2019512705 | A | * | 5/2019 | |

* cited by examiner

S11    generate light pulse sequence

S12    emit light pulse sequence into surroundings

S13    receive reflected portion of the light pulse sequence

S14    evaluate received portion

S31 — generate light pulse sequence

S32 — [decouple a portion of light needed for generating light pulse sequence into optical delay chain]

S33 — couple delayed decoupled light into the non-decoupled light

S34 — emit generated light pulse sequence

S35 — received reflected portion of light pulse sequence

S36 — evaluate received portion input output

S51 — generate light pulse sequence

S52 — introduce light pulse sequence into saturable absorber

S53 — emit generated light pulse sequence into surroundings

S54 — receive reflected portion of light pulse sequence

S55 — evaluate received light portion input output

90

91

93

92 light source

METHOD FOR GENERATING LIGHT PULSES OF A LIDAR SYSTEM

FIELD

The present invention is directed to a method for generating light pulses of a LIDAR system.

BACKGROUND INFORMATION

LIDAR systems or LIDAR sensors are one building block on the way to highly automated driving. They are used, among other things, to measure the distance of objects and to generate a surroundings map around the LIDAR system. They may offer a high spatial resolution as well as cover a large measuring range, i.e., detect both near and distant objects. The light reflected by an object or its intensity, which is received and evaluated by the LIDAR system, plays an important role here. Too high a pulse intensity may disturb the reasonable evaluation of the reflected pulse and prevent a usable measured value, for example if the detector becomes saturated. Too low a pulse intensity may make it impossible to detect distant objects.

SUMMARY

A method is provided for generating light pulses of a LIDAR system.

In accordance with an example embodiment of the present invention, a light pulse sequence is generated, which includes at least one first light pulse and one second light pulse of different intensities. This takes place with the aid of a light source, in particular a laser. For example, the pulse intensity may be defined by the peak amplitude of the pulses, and the pulse intensity may differ, for example, in the range of a factor of 100, in particular 200 to 500. The first and second pulses may have, for example, a time interval in the range of 1 ns to 1000 ns, in particular 500 ns.

The light pulse sequence generated in this way is emitted with the aid of the LIDAR system, and the portion of the light pulse sequence reflected by an object is received by the LIDAR system.

The received portion of the light pulse sequence is evaluated and may be used to measure the distance of the object.

This method is advantageous, since no complex charging circuit for the light source needs to be used for the method, which ensures that the method is easy to implement. Although the use of constant current sources for the laser source may provide a remedy here, constant current sources nevertheless have the problem that, in the event of a malfunction, considerably more laser power may be generated, making ensuring eye safety a major challenge, and complex safety mechanisms become necessary. This is not needed in the case of the provided method. An easy evaluation of the reflected light pulse sequence is furthermore possible without complex long filters, whereby the computing time remains within justifiable limits.

Further advantageous specific example embodiments of the present invention are disclosed herein.

When generating the light pulse sequence, a first light pulse having a predefined first intensity is advantageously generated. After generating the first light pulse, a second light pulse having a predefined second intensity is also generated. The predefined second intensity is higher than the predefined first intensity. This is advantageous, since a saturation of a detector of the LIDAR system by the first light pulse having a lower intensity is avoided. By emitting two pulses having intensity differences in the indicated sequence, the problem is avoided that signals of the strong pulse fall into a measuring window of the weak pulse and thus are no longer distinguishable therefrom, which may corrupt the evaluation for the distance measurement.

A predefined first time interval advantageously exists between the light pulses of the light pulse sequence in each case. This is advantageous, since the individual light pulses may thus be evaluated separately and permit a minimizing of the computing time. For example, no long filter banks are necessary to evaluate the individual pulses of the pulse sequence. A sufficiently long first time interval furthermore permits clarity in the interpretation of the received signal, since the weak light pulse has only a limited range. The weak light pulse returns to the detector before the strong light pulse is emitted.

Alternatively, a shorter first time interval may also be used, the pulses in this case being separated from each other in the evaluation.

When evaluating the received portion of the light pulse sequence, i.e., of the reflected light, the received first light pulse is advantageously evaluated and the received second light pulse is evaluated. This advantageously takes place separately, in particular consecutively, in an electronic control unit to minimize the computing time and the complexity of the electronic control unit. The evaluations of the light pulses are subsequently combined to increase the distance measuring range of the LIDAR system. This is possible, since, in particular, a near measuring range is covered by the pulse having a lower intensity, and a more distant measuring range is covered by the pulse having a higher intensity. The light having a higher intensity is reflected in the case of a near object rather than in the case of a more distant object, so that a saturation of the detector of the LIDAR system may occur if a pulse of high intensity is reflected by a near object. This consequently makes a reliable distance measurement impossible. By emitting the light pulse of a lower intensity, a measurement of the distance may reliably take place even in this case, so that an expanded measuring range is implemented by a combination of the evaluations.

The first light pulse advantageously has a shorter pulse duration than the second light pulse. This is advantageous, since a blinding of a detector of the LIDAR system by internal reflections of an emitted pulse is weakened or avoided thereby. This is relevant, in particular, for SPAD detectors. It permits a reliable measurement of short distances. It also makes it possible to differentiate the first and second pulses, based on the pulse duration measured by the detector.

When generating the light pulse sequence, a portion of the light necessary for generating the light pulse sequence is decoupled into an optical delay chain, in particular with the aid of a beam splitter. The decoupled light, which was delayed by the optical delay chain, is furthermore coupled into an optical path of the non-decoupled portion of the light necessary for generating the light pulse sequence. By decoupling, delaying and coupling in again, it is possible to generate a light pulse sequence having at least two light pulses of different intensities. This is advantage, in particular, if the light is generated by a light source or laser source having a constant pulse energy. This permits a simple control circuit for the light or laser source by installing simple optical elements. The pulse intensity of the delayed light may furthermore be easily established by the beam splitter. It may thus be easy to predefine whether a higher-intensity pulse first occurs, followed by a one of lower intensity, or vice versa. The time interval between the resulting pulses may also be easily predefined via the design of the delay chain without complex electronic circuits being necessary.

The optical delay chain advantageously includes an optical waveguide and/or a free space propagation of the decoupled light. The period of time required by the decoupled light to be coupled in is greater than the period of time required by the non-decoupled light before the decoupled light is coupled in. This is advantageous, since the time interval between the pulses may thus be easily established.

The light needed to generate the light pulse sequence is advantageously introduced into an optical resonator for the purpose of generating the at least two light pulses of different intensities. This is advantageous, since it may be easily implemented without complex electronic circuits. An optical resonator is advantageous, in particular, when a multiplicity of pulses in the pulse sequence is desired.

The light needed to generate the light pulse sequence is advantageously introduced into a saturable absorber for the purpose of generating the at least two light pulses of different intensities. A light pulse sequence of pulses of the same intensity is introduced into the optical absorber. A large part of the intensity of the first pulse is absorbed by the absorber, so that the first pulse emerging from the absorber has a lower intensity than a second pulse following the first pulse, in particular if the second pulse follows the first pulse within a period of time which is shorter than the relaxation time of the optical absorber. A saturation effect occurs in the absorber, which results in a reduced absorption upon the striking of the second pulse.

The saturable absorber advantageously includes a semiconductor material and/or a phosphorescent material. This is advantageous, since these materials have a saturable absorption behavior, which is suitable for achieving the behavior described above and for achieving a corresponding modulation of the pulse intensity of multiple pulses spaced several nanoseconds apart.

In accordance with an example embodiment of the present invention, the described method steps are advantageously carried out multiple times and/or continuously, a predefined second time interval being present between the steps of emitting the particular light pulse sequence. The second time interval is greater than the first time interval, i.e., the distance between the particular light pulse sequences is greater than that between the individual pulses within a light pulse sequence. The multiple and/or continuous execution is advantageous, since a multiplicity of objects and their distances may thus be detected, and corrected distance data may be detected during a movement. A multiplicity of evaluatable, reflected pulses is thus present, by means of which good measurement statistics may be achieved and an "abrupt change" of the distance signal may be prevented or attenuated. The advantages of the method are furthermore especially apparent, in particular where a possible saturation behavior of a detector of a LIDAR system is concerned, since this is avoided or attenuated by the described method.

The receipt of the reflected light advantageously takes place with the aid of a SPAD detector, a so-called single-photon avalanche diode detector. This is advantageous, since the method is particularly beneficial to a SPAD detector, due to its dead times and its saturation behavior. Since the SPAD technology additionally has problems with the dynamic range, since only a few SPAD cells are available for a measurement, the described method may be advantageously used for this type of detector.

A LIDAR system is also the subject matter of the present invention, which includes at least one means, which is configured to carry out the described method. In accordance with an example embodiment of the present invention, a LIDAR system of this type includes, for example, a light source, an electronic control unit and a detector for receiving the reflected light. A deflecting mirror or an optical transceiver system may also be present. The aforementioned advantages may be implemented in this way.

A computer program is furthermore the subject matter of the present invention, encompassing commands, which effectuate that the provided LIDAR system carries out all steps of the described method. The aforementioned advantages may be implemented in this way.

A machine-readable memory medium is also the subject matter of the present invention, on which the provided computer program is stored.

BRIEF DESCRIPTION OF THE DRAWINGS

Advantageous specific embodiments of the present invention are illustrated in the figures and explained in greater detail in the description below.

DETAILED DESCRIPTION OF EXAMPLE EMBODIMENTS

Figure 1:
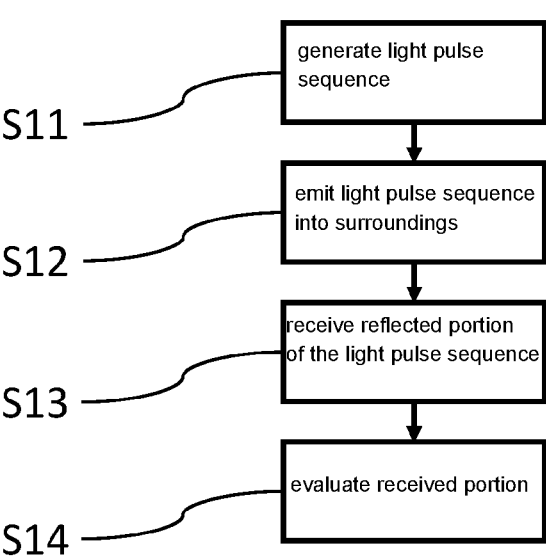
FIG. 1 shows a flowchart of the provided method according to a first specific embodiment, in accordance with the present invention.

The same reference numerals designate the same device components or the same method steps in all figures.

FIG. 1 shows a flowchart of the provided method for generating light pulses of a LIDAR system according to a first specific embodiment. In a first step S11, a light pulse sequence is generated by a light source of a LIDAR system, the light pulse sequence including at least one first light pulse and one second light pulse. The light pulses have a different intensity.

In a second step S12, which may overlap with first step S11, the light pulse sequence is emitted by the LIDAR system into its surroundings.

In a third step S13, a portion of the light pulse sequence reflected by an object is received by the LIDAR system. The originally emitted light pulse sequence may be entirely or partially received again, possibly in attenuated form, depending on where the light pulse sequence strikes and is reflected. The receipt of the light may be implemented by a corresponding detector of the LIDAR system.

In a fourth step S14, the received portion of the light pulse sequence is evaluated to ascertain therefrom, for example, the distance of the object.

Figure 2:
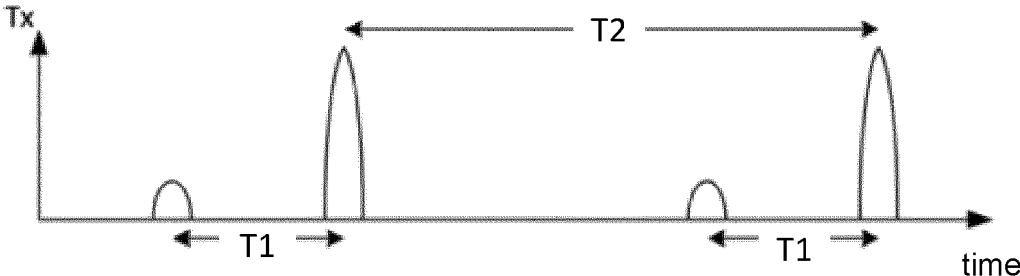
FIG. 2 shows a schematic representation of light pulses resulting from the provided method according to the first specific embodiment, in accordance with the present invention.

FIG. 2 shows a schematic representation of light pulses resulting from the provided method according to the first specific embodiment. The intensity of the particular pulses is plotted on vertical axis Tx, and the time profile is plotted on horizontal axis, time. The two pulses of the light pulse sequence have a predefined first time interval T1, and the particular light pulse sequences have a predefined second time interval T2. Predefined time interval T2 may be, for example, in the range from 1 µs to 10 µs, in particular around 2 µs.

Figure 3:
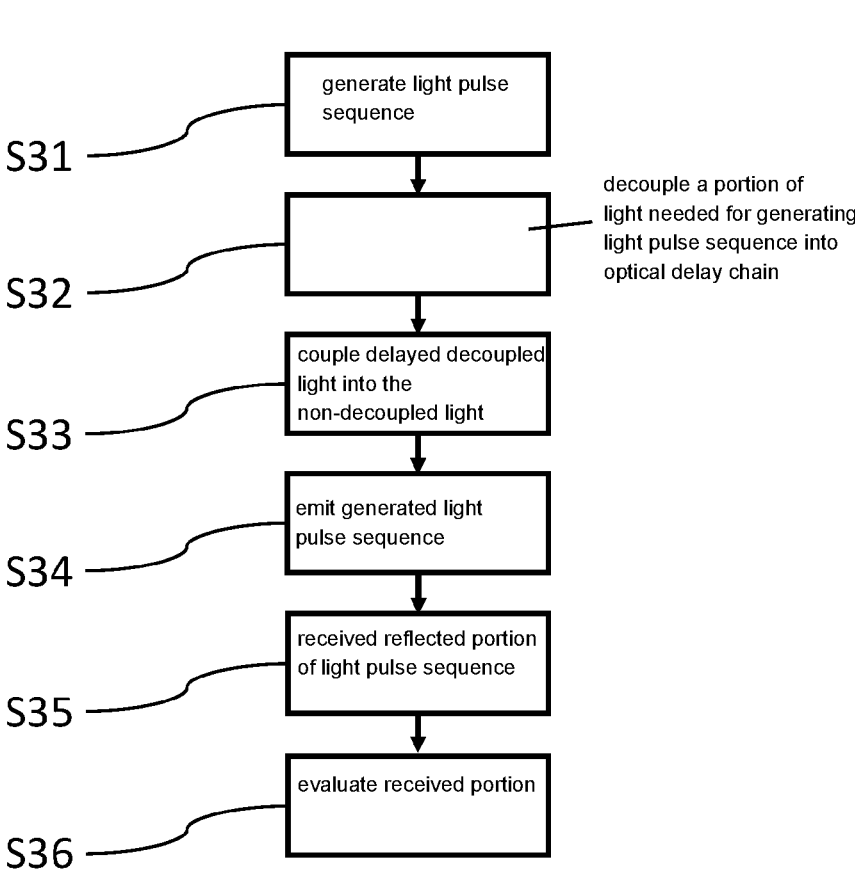
FIG. 3 shows a flowchart of the provided method according to a second specific embodiment, in accordance with the present invention.

FIG. 3 shows a flowchart of the provided method for generating light pulses of a LIDAR system according to a second specific embodiment. In a first step S31, a light pulse sequence is generated by a light source of a LIDAR system, the light pulse sequence including at least one light pulse. The light source generates the light pulses with the same intensity. The light source may thus be provided with a simpler and more cost-effective design.

In a second step S32, a portion of the light needed for generating the light pulse sequence is decoupled into an optical delay chain. For example, a beam splitter may be used for this purpose. The intensities of the resulting pulses may be established thereby.

In a third step S33, the decoupled light, which was delayed by the optical delay chain, is coupled in again to the non-decoupled light, for the purpose of generating the light pulse sequence including the at least two pulses of different intensities.

In a fourth step S34, which may overlap with the above steps, the light pulse sequence generated in this way is emitted by the LIDAR system into its surroundings.

In a fifth step S35, a portion of the light pulse sequence reflected by an object is received by the LIDAR system. The originally emitted light pulse sequence may be entirely or partially received again, possibly in attenuated form, depending on where the light pulse sequence strikes and is reflected. The receipt of the light may be implemented by a corresponding detector of the LIDAR system.

In a sixth step S36, the received portion of the light pulse sequence is evaluated to ascertain therefrom, for example, the distance of the object.

Figure 4:
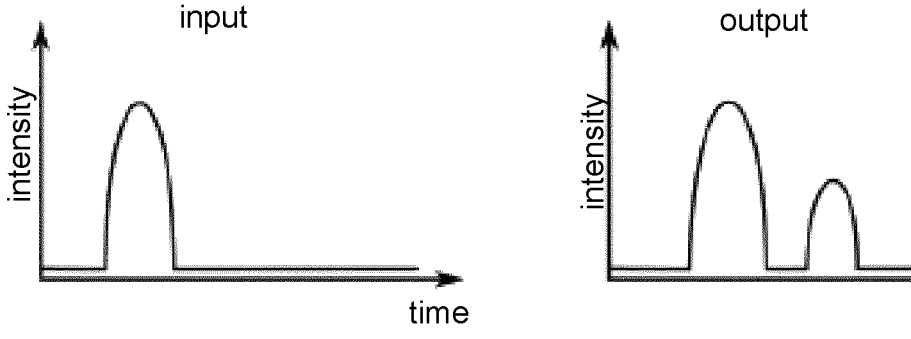
FIG. 4 shows a schematic representation of light pulses resulting from the provided method according to the second specific embodiment, in accordance with the present invention.

FIG. 4 shows a schematic representation of light pulses resulting from the provided method according to the second specific embodiment. The intensity of the particular pulses is plotted on vertical axis, Intensity, and the time profile is plotted on horizontal axis, Time. A light pulse, as generated by the light source, is shown in the illustration on the left. It has a predefined intensity. The resulting light pulses after passing through the optical delay chain are shown on the right. The time intervals and the illustrated intensities are only schematic: The pulse in the illustration on the left results in the displayed two pulses having a predefined first and second intensity in the illustration on the right.

Figure 5:
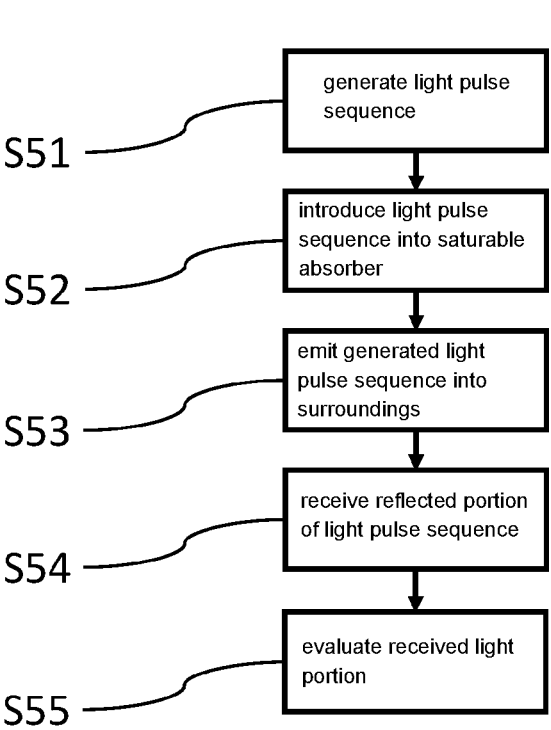
FIG. 5 shows a flowchart of the provided method according to a third specific embodiment, in accordance with the present invention.

FIG. 5 shows a flowchart of the provided method for generating light pulses of a LIDAR system according to a third specific embodiment. In a first step S51, a light pulse sequence is generated by a light source of the LIDAR system, the light pulse sequence including at least one first light pulse and one second light pulse. The light source generates the light pulses with the same intensity. The light source may thus be provided with a simpler and more cost-effective design.

In a second step S52, the light pulse sequence generated in first step S51 is introduced into a saturable absorber. A large portion of the first light pulse is absorbed by the saturable absorber, so that the transmitted first light pulse has a lower intensity. This also results in a saturation effect of the absorber or the absorber material, which reduces the absorbency thereof for a certain period of time until a relaxation to the non-excited state has again taken place. The second light pulse following the first light pulse, which follows within a time period which is shorter than the indicated relaxation time of the absorber, is therefore absorbed in a smaller portion than the first light pulse, so that the transmitted second light pulse has a higher intensity than the transmitted first light pulse.

In a third step S53, which may overlap with first step S51, the light pulse sequence generated in this way is emitted by the LIDAR system into its surroundings.

In a fourth step S54, a portion of the light pulse sequence reflected by an object is received by the LIDAR system. The originally emitted light pulse sequence may be entirely or partially received again, possibly in attenuated form, depending on where the light pulse sequence strikes and is reflected. The receipt of the light may be implemented by a corresponding detector of the LIDAR system.

In a fifth step S55, the received portion of the light pulse sequence is evaluated to ascertain therefrom, for example, the distance of the object.

Figure 6:
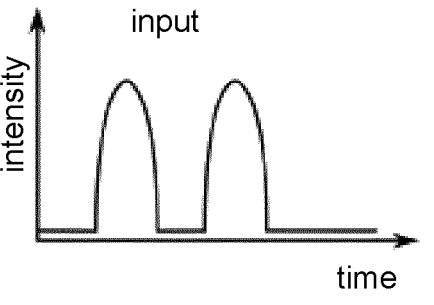
FIG. 6 shows a schematic representation of light pulses resulting from the provided method according to the third specific embodiment, in accordance with the present invention.
Figure 6:
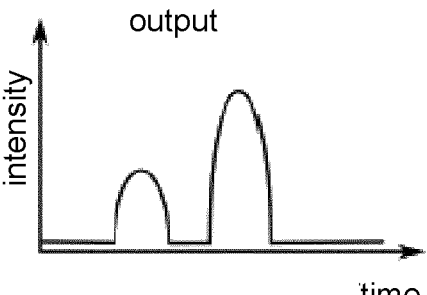

FIG. 6 shows a schematic representation of light pulses resulting from the provided method according to the second specific embodiment. The intensity of the particular pulses is plotted on vertical axis, Intensity, and the time profile is plotted on horizontal axis, Time. Two light pulses, as generated by the light source, are shown in the illustration on the left as an example. They have a predefined intensity. The resulting light pulses after passing through the optical absorber are shown on the right. The time intervals and the illustrated intensities are only schematic: The two pulses in the illustration on the left result in the displayed two pulses having a predefined first and second intensity in the illustration on the right.

Figures 7, 8:
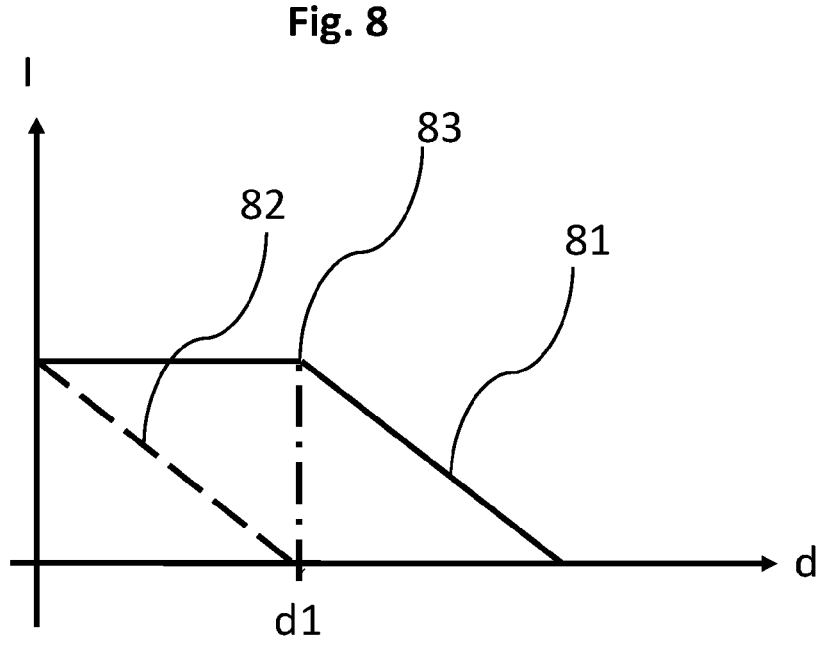
FIG. 7 shows a schematic representation of the evaluated received light pulse sequence for the distance measurement in a histogram, in accordance with the present invention.
FIG. 8 shows a schematic representation of the evaluated first and second light pulses, in accordance with an example embodiment of the present invention.

FIG. 7 shows a schematic representation of the evaluated received light pulse sequence for the distance measurement in a histogram. The histogram has different classes on horizontal axis, bin, which represent different distances of objects from the LIDAR system. A limiting value line thr is also plotted, which shows the intensity limiting value, starting at which an object is viewed as being present. Vertical axis I represents the intensity. The objects represented by intensities 71, 72, 73 are thus detected by the LIDAR system, while the object represented by intensity 74 is not detected, since the object is located outside the maximum range of the weak pulse.

FIG. 8 shows a schematic representation of an evaluated reflected light pulse sequence according to the description. The corresponding intensity of the reflected pulses is plotted on vertical axis I, and a reference number for the distance is plotted on the horizontal axis. The evaluated intensity curve for a pulse having a high intensity runs in parallel to vertical axis I up to a certain distance reference number dl. A bend then occurs at point 83. This means that no reliable pieces of distance and intensity information are present up to this distance, arriving from the close-up range, since the reflected received pulse has too high an intensity. This results in a saturation of a receiver of the reflected pulse, the saturation behavior occurring, in particular, in SPAD detectors. Starting at distance reference number dl, i.e., at point 83, the intensity curve runs linearly in the schematic representation, designated here by 81. The specific appearance of the curve here is insignificant, but rather, in particular, the fact that a linear or possibly also nonlinear one-to-one correlation exists between the distance and the intensity. It is then possible thereby to calculate back from the received pulse intensity to the distance. As a result, no reliable pieces of distance information are yet present for the close-up range up to point 83 or to distance dl.

Intensity curve 82 results from the evaluation of the pulse having a low intensity, a linear or possibly also nonlinear one-to-one correlation again existing between the distance and the intensity. This applies up to distance dl, the distance of an object thereby being reliably determined up to distance dl. If intensity curve 81 of the pulse having a high intensity is now combined with intensity curve 82 of the pulse having a low intensity, a reliable distance and intensity measurement for objects may be facilitated for the entire measuring range, without the electrical behavior of a receiver having a limiting effect.

Figure 9:
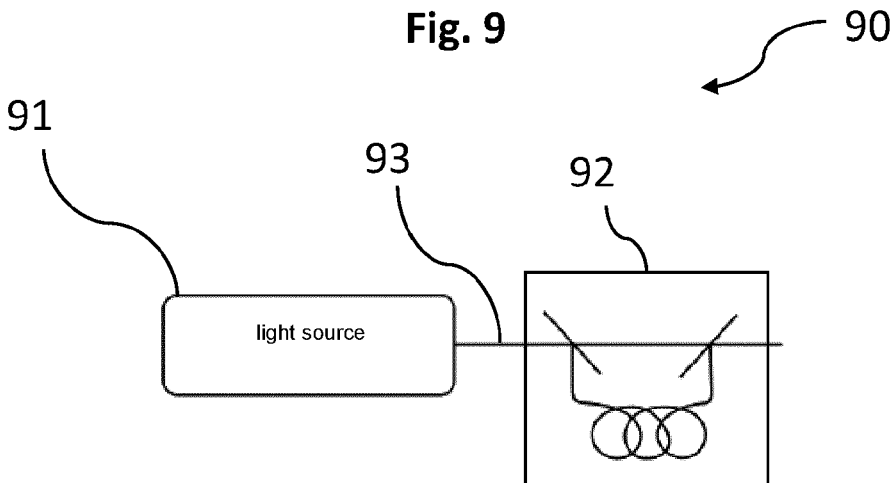
FIG. 9 shows a schematic representation of a LIDAR system, including an optical delay chain, in accordance with an example embodiment of the present invention.

FIG. 9 shows a schematic representation of a LIDAR system 90, including an optical delay chain 92. Delay chain 92 includes two beam splitters for coupling a portion of light beam 93 out and in, by means of which two pulses having a predefined first intensity and a predefined second intensity may be generated from one pulse having a predefined intensity. The light beam is generated by a light source 91 and emitted into the surroundings of the LIDAR system by suitable means, for example, a corresponding optical element.

What is claimed is:

1. A method for generating light pulses of a LIDAR system, comprising the following steps:
 a) generating a light pulse sequence, which includes at least one first light pulse and one second light pulse of different intensities, by a light source, the light source being a laser;
 b) emitting the light pulse sequence by the LIDAR system;
 c) receiving, by the LIDAR system, a portion of the light pulse sequence reflected by an object; and
 d) evaluating the received portion of the light pulse sequence for measuring a distance and the intensity.

2. The method as recited in claim 1, wherein the generation of the light pulse sequence includes:
 e) generating the first light pulse having a predefined first intensity;
 f) after generating the first light pulse, generating the second light pulse having a predefined second intensity, the predefined second intensity being higher than the predefined first intensity.

3. The method as recited in claim 1, wherein a predefined first time interval exists respectively between the first and second light pulses of the light pulse sequence.

4. The method as recited in claim 1, wherein the evaluation includes:
 g) evaluating a received first light pulse;
 h) evaluating a received second light pulse;
 i) combining the evaluations of the received first and second light pulses for expanding the distance measuring range of the LIDAR system.

5. The method as recited in claim 1, wherein the first light pulse has a shorter pulse duration than the second light pulse.

6. The method as recited in claim 1, wherein the step of generating the light pulse sequence includes:
 l) introducing light needed for generating the light pulse sequence into an optical resonator to generate the at least first and second light pulses of different intensities.

7. The method as recited in claim 1, wherein the step of generating the light pulse sequence includes:
 m) introducing light needed for generating the light pulse sequence into a saturable absorber to generate the at least first and second light pulses of different intensities.

8. The method as recited in claim 7, wherein the saturable absorber includes a semiconductor material and/or a phosphorescent material.

9. The method as recited in claim 1, wherein the method steps are carried out multiple times and/or continuously, a predefined second time interval being present between the steps of emitting the light pulse sequence, the second time interval being greater than the first time interval.

10. The method as recited in claim 1, wherein the receipt of the reflected portion takes place using a SPAD (single-photon avalanche diode) detector.

11. A method for generating light pulses of a LIDAR system, comprising the following steps:
 a) generating a light pulse sequence, which includes at least one first light pulse and one second light pulse of different intensities, by a light source, the light source being a laser;
 b) emitting the light pulse sequence by the LIDAR system;
 c) receiving, by the LIDAR system, a portion of the light pulse sequence reflected by an object; and
 d) evaluating the received portion of the light pulse sequence for measuring a distance and the intensity,
 wherein the step of generating the light pulse sequence includes:
  j) decoupling a portion of light needed for generating the light pulse sequence into an optical delay chain using a beam splitter;
  k) coupling the decoupled light, which was delayed by the optical delay chain into an optical path of the non-decoupled portion of the light necessary for generating the light pulse sequence to generate the light pulse sequence, which includes the at least first and second light pulses of different intensities.

12. The method as recited in claim 11, wherein the optical delay chain includes an optical waveguide and/or a free space propagation of the decoupled light, a time period required by the decoupled light until it is coupled in being greater than a time period required by the non-decoupled light until the decoupled light is coupled in.

13. A LIDAR system, comprising:
 an electronic controller configured to generate light pulses of a LIDAR system, the electronic controller configured to:
  a) generate a light pulse sequence, which includes at least one first light pulse and one second light pulse of different intensities, by a light source, the light source being a laser;
  b) emit the light pulse sequence by the LIDAR system;
  c) receive, by the LIDAR system, a portion of the light pulse sequence reflected by an object; and d) evaluate the received portion of the light pulse sequence for measuring a distance and the intensity.

14. A non-transitory machine-readable memory medium on which is stored a computer program for generating light pulses of a LIDAR system, the computer program, when executed by a computer, causing the LIDAR system to perform the following steps:

a) generating a light pulse sequence, which includes at least one first light pulse and one second light pulse of different intensities, by a light source, the light source being a laser;

b) emitting the light pulse sequence by the LIDAR system;

c) receiving, by the LIDAR system, a portion of the light pulse sequence reflected by an object; and d) evaluating the received portion of the light pulse sequence for measuring a distance and the intensity.

\* \* \* \* \*